INVENTOR
ARTHUR H. YOUMANS
BY
Robert K. Schumacher
ATTORNEY

United States Patent Office
3,465,151
Patented Sept. 2, 1969

1

3,465,151
METHOD AND APPARATUS FOR OXYGEN ACTIVATION WELL LOGGING
Arthur H. Youmans, Tulsa, Okla., assignor, by mesne assignments, to Dresser Industries, Inc., Dallas, Tex., a corporation of Delaware
Continuation of application Ser. No. 579,829, Apr. 23, 1956. This application Oct. 24, 1967, Ser. No. 677,781
Int. Cl. G01t 1/16
U.S. Cl. 250—83.3      13 Claims

ABSTRACT OF THE DISCLOSURE

This method and apparatus for making an oxygen activation log utilize a source 14 mev. neutrons to irradiate earth formations in a borehole. The gamma rays emitted by the irradiated earth formations are detected by a scintilation counter which is set to selectively measure the gamma rays emitted with energies between 1.5 mev. and 3 mev. The gamma rays with energies within this range have been found to permit the making of an oxygen activation log by discriminating statistically from gamma rays produced by other elements and minerals in the borehole.

---

Figures 1, 2:
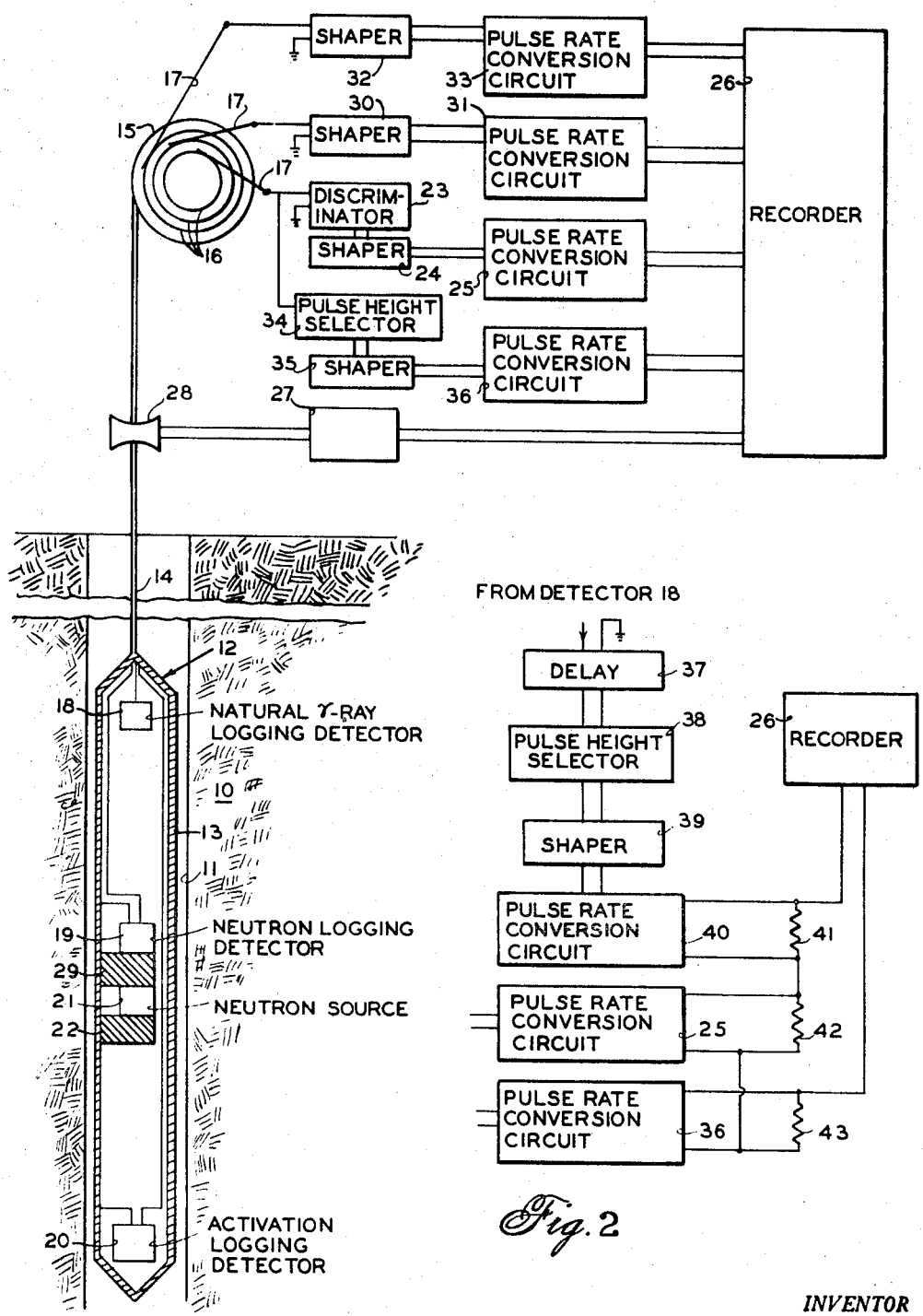

This is a continuation of application Ser. No. 579,829, filed Apr. 23, 1956, now abandoned.

This invention relates to geophysical prospecting and particularly to the art of radioactivity well logging wherein formations in the earth are made artificially radioactive and the radioactive decay of the nuclei of the formations is measured as an indication of the composition of the formations and their contents. More particularly this invention relates to a method and apparatus for measuring oxygen content and hence for distinguishing between formations filled with oil and formations filled with water.

It is old in the art to log oil wells by measuring the natural radioactivity of the strata adjacent to a well or by irradiating the strata with fast neutrons and simultaneously measuring neutrons or gamma rays thereupon reaching a detector in the well. The source of neutrons commonly used is a mixture of radium and beryllium. With such a source, it has been proposed to irradiate the formations with neutrons to activate the formations, that is, to make the nuclei of the formations artificially radioactive. Following a suitable interval the degree of activation is measured by measuring the gamma radiation from the artificially radioactive nuclei.

In the prior art there has been no way to identify oil directly. In the instant invention oil is identified rather unambiguously by a deficiency of oxygen, that is, the relative amount of oxygen present is measured, with a deficiency being indicative of oil. It has not been previously suggested to make an activation log for oxygen content; in fact, when using ordinary neutron sources, activation of oxygen is not practical since it requires neutron energies of at least 10.6 mev. in order to make the oxygen radioactive. In the instant invention, it is proposed to use a different source, a source of 14 mev. neutrons which can be used to activate the oxygen by the reaction $O^{16}(n,p)N^{16}$, which is possible when the neutron energy is greater than 10.6 mev. $N^{16}$ has a half life of 7.3 seconds and emits gamma rays of 6.13 mev. energy in 75 percent of the disintegrations and 7.1 mev. in 6 percent of the disintegrations; beta rays of up to 10 mev. energy may also be emitted in the disintegration process.

A source of 14 mev. neutrons may be made by a borehole accelerator in which deuterium ions are accelerated against a tritium target. These neutrons have sufficient energy to make oxygen radioactive. The formations are irradiated by such a neutron source and the induced radioactivity is measured by a detector suitably spaced from the source and drawn past the irradiated formations as the instrument moves through the borehole. Oxygen activation gamma rays may be detected selectively because of their high energy, making it possible to measure the activation effects without an undesired background of natural gamma rays, which have lower energy. Further, oxygen activation provides higher energy gamma rays than practically any other activation; so that selection of high energy gamma rays by some discrimination means permits measurement of oxygen activation to the exclusion of other activation. The only possible interference is from gamma rays produced upon neutron capture and from other instantaneous nuclear reactions. This interference is prevented by dense material intervening between the source of these gamma rays and the detector. In other words the detector is some distance from the irradiated formations at the time of irradiation and occurrence of instantaneous gamma rays. Later, after these gamma rays have disappeared, the detector is brought near the irradiated formations to measure the delayed gamma rays resulting from the decay of the activated oxygen, that is $N^{16}$.

Certain other improvements and modifications may also be employed which make a log based on oxygen activation particularly practical. Moreover, with respect to interpretation of such a log, unique advantages exist, as may be seen from the following considerations. Oxygen is the most abundant of the elements of the earth's crust. It is the major constituent in all rocks and exists in most non-porous rocks in proportions varying between about 48 percent and 54 percent by weight. Water also contains oxygen, but oil and gas do not. As a matter of fact, water contains about two-thirds as much oxygen per cubic centimeter as does solid sandstone or limestone. Accordingly, it may be seen that the oxygen content of all rocks will fall with relatively narrow limits, if the rocks are non-porous or if their porous spaces are filled with water. If, on the other hand, a porous rock is filled with oil, the oxygen content will be smaller than that of other rocks almost exactly in proportion to the oil saturation of the rock expressed in percentage by volume.

As an example, pure silicon dioxide having a density of 2.65 grams/cc., contains about $5.3 \times 10^{22}$ oxygen atoms per cc. Water contains about $3.35 \times 10^{22}$ oxygen atoms per cc. Thus a volume filled with water contains about 63 percent as much oxygen as does an equal volume of solid sandstone. As a consequence a porous sandstone saturated with water will have an oxygen content lower than that of a solid sandstone to the extent of about 0.4 percent reduction in oxygen for each 1 percent of porosity. On the other hand, a porous rock saturated with water has also a lower density than a solid rock to the extent of approximately 0.4 percent reduction in density for each 1 percent increase in porosity. The proposed method of logging is to measure the oxygen content by means of the gamma rays emitted by the formation; so the lower density rock will attenuate the gamma rays to a lesser extent and the effects of reduced oxygen content is more or less compensated for by the reduction in density. The result is that a log based on detection of gamma rays from oxygen activation will show almost no difference between solid rock and water saturated rock. On the other hand, the difference in oxygen content between a water saturated rock and an oil saturated rock is substantial. In the case of a sandstone of grain density 2.65 grams/cc., the variation in oxygen content for each percent of variation in oil content is about 0.6 percent. If two sands of 35 percent porosity are respectively oil and water filled, the oil sand will contain about 75 percent as much oxygen as does the water sand. Experience has shown that the intensity of the oxygen activation gamma rays induced in the two cases are in approximately this same ratio. It may, therefore, be concluded that the proposed log provides a sensitive method for detection and quantitative measurement of oil saturation.

Since the log is not sensitive to water filled porosity, it will not give satisfactory quantitative measurements when the permeable zones of interest have been invaded by water base drilling mud. Moreover, if the borehole is filled with water, activation of the oxygen in the borehole fluid will tend to obscure the radiation from the formations. Accordingly, the method will have its greatest utility in empty or oil filled boreholes and in boreholes drilled with oil base mud. In such cases the log will indicate, but cannot differentiate between, oil producing zones and other permeable zones into which oil has been forced during the drilling operation. However, even in the case of water filled boreholes variations in oxygen content and in formation density will be indicated by the log and valuable information will be obtained from it.

To make an oxygen activation log, a source of 14 mev. neutrons is required since few neutrons from radium-beryllium sources have sufficiently high energy to produce the desired nuclear reaction. The gamma ray detector should be a scintillation counter or other energy selective detector. If the neutron output is constant, the detector must be placed at a sufficient distance below the source so as not to detect neutrons from the source or any of the instantaneous gamma radiation produced in the rock by the neutrons. Then the log is made by continuously moving the instruments upward through the borehole at a constant rate of speed. In so doing the neutron source uniformly irradiates the formation; the detector, which is placed some four feet or more below the source, subsequently moves past the formation, where it may detect gamma rays emitted by the formation materials. These will include natural gamma rays and gamma rays from radioactivity induced in the oxygen, aluminum, silicon, magnesium, iron and other elements. However, among these only the gamma rays from oxygen activation have energies in excess of 3 mev. Accordingly, if the detector is biased to detect only gamma rays above 3 mev. or so, it will observe only gamma rays due to oxygen activation. It should be mentioned that, although discriminating against pulses indicative of lower energy gamma rays permits positive measurement of gamma rays from oxygen activation, the adjustment of discriminating means so as to pass only pulses characteristic of oxygen will at the same time discriminate against a large number of the gamma rays from oxygen activation which have been degraded before being detected or the energy of which is not completely detected. This would cause the loss of information. Therefore, the discriminating means is adjusted to pass pulses of lower energy to retain this information. It has been found that the passing of pulses indicative of gamma rays of energies greater than 1.5 mev. permits measurements of enough more gamma rays from oxygen activation as to overshadow the gamma rays from interfacing processes which must therefore be measured at the same time. The intensity of the measured radiation will depend upon the strength of the neutron source, the speed of the logging instrument, and the distance between the source and detector, as well as upon the formation properties. If the logging speed is varied, the length of time during which a particular point in the well is irradiated is also changed, as is the length of the time interval elapsing between the time a point is irradiated and that when the detector reaches it. Thus a reduction of the logging speed increases the period of the irradiation and tends to increase the ratioactivity induced in the formations; on the other hand, the interval between irradiation and measurement of the radioactivity is proportionately increased, which allows the radioactivity to decay before measurement and thus tends to reduce the observed intensity.

For the detection of a particular element, such as oxygen, and other things being constant, there exists on optimum logging speed for each spacing between neutron source and gamma ray detector. By "optimum logging speed" is means a logging speed for a particular assemblage of equipment for which small changes in speed make substantially no change in the detection signal. In general it is desirable that the spacing between source and detector be as small as possible without permitting error from interfering reactions. In detecting oxygen, low energy gamma rays may be discriminated against by proper adjustment of a threshold circuit in the output circuit of the gamma ray detector; this will eliminate substantially all interfering processes except for gamma rays of neutron capture and other instantaneous nuclear reactions. As above stated, these are eliminated from interference by spacing the detector so far from the source and region of instantaneous reactions that substantially no interfering gamma rays reach the detector. Theory and experience show that the relationship between optimum logging speed and the effective distance between source and detector may be represented approximately by the equation $$V_o = \lambda L$$

where, $V_o$ is the optimum logging speed,
$\lambda$ is the decay constant for the activated nuclei, and
L is the effective distance between source and detectors.

At a spacing of six feet the optimum logging speed is approximately 34 feet per minute for the selective detection of oxygen, $\lambda$ being 0.094 per second for $N^{16}$. The existence of this optimum logging speed is an extremely significant advantage. Particularly, this is true because the optimum speed for oxygen is one admirably suited to commercial logging, being slow enough to permit the use of reasonable time constants in the detecting and recording apparatus but fast enough to allow logging of entire wells in a reasonable, economical time. When operating at the optimum speed, 20 percent changes in speed from 10 percent more to 10 percent less than optimum cause no more than about one percent variations in counting rate. At half the optimum speed the effect of such percentage changes would be about a 20 percent variation in counting rate, and at twice optimum about 10 percent.

At this optimum logging speed not only is the measurement relatively insensitive to the changes in the logging speed but the detection signal is at its maximum for any continuous logging speed. Since the optimum logging speed differs for different elements, it is thus possible to discriminate in favor of a particular element by operating at the optimum logging speed for that particular element.

Although it is desirable for the source-to-detector spacing to be as small as possible in order that the activation not decay substantially before the detector arrives, where the detection signal is strong enough it may be desirable to sacrifice a portion of the information in order to make the measurements more rapidly. In commercial well logging the logging speed may be effectively determined by other factors such as the allowable time for making a log or the speed at which other logs simultaneously made must be run. If the logging speed is too slow, the time necessary to perform a logging operation over a large portion of the well may be so long as to be prohibitively expensive. In any case where the logging speed is determined by other considerations, the activation log may nevertheless be made at optimum logging speed by adjusting the source to detector spacing in accordance with the above formula.

Experience has shown that a neutron source of strength between $10^8$ and $10^9$ neutrons per second will produce a high enough level of activation to provide a log of good statistical accuracy. However, there may be times when greater precision is required. In this case and in the case where optimum logging speed is so slow as to be uneconomical it is desirable to perform the logging in discrete steps rather than continuously. In this case the neutron source is placed opposite a particular stratum and allowed to remain for an extended period. Then the detector is quickly raised to a position opposite this stratum and the activation is measured. More particularly, the instrument is held stationary in the well while the source irradiates the formation of interest. After an interval of about one minute the induced radioactivity of the formation oxygen will have reached substantially an equilibrium or saturation value. The instrument is then quickly drawn up so that the detector is opposite the point which has been irradiated. When the detector has reached the correct spot, the counting rate is observed as the radioactivity decays. It is essential to measure precisely the time interval elapsing between the cessation of irradiation and the beginning of the measurement of the activity. This can be most precisely done if the source is turned off before the instrument is moved. In this case a predetermined interval such as 15 seconds can be allowed for the instrument to reach the correct position in the well, after which a scaler may be automatically turned on and allowed to count for perhaps an additional 15 seconds. The total number of counts obtained in this way will be proportional to the deflection of the log but will be statistically much superior. This measurement may then be repeated in other zones of interest. Where a number of measurements are to be made over an extensive part of a well, irradiation of one horizon may be effected while detection at a previously irradiated horizon is performed. This permits measurements only at discrete intervals on one movement through the well. Subsequent series of measurements are required to make measurements at intermediate horizons.

Although it is necessary to wait until the activation is in equilibrium for maximum activation and for substantially complete decay for maximum detection information, this is not always economical, especially where the activation produces nuclei of relatively long half lives. It does have the additional advantage that exact timing is not necessary when the times are a relatively large number of half lives of the activated nuclei. However, where time is limited, a time of two half lives permits 75 percent of equilibrium to be reached and lesser irradiation and detection times such as this may be used without the loss of too much information. Under these circumstances, the times must be carefully measured or predetermined, since the amount of activation and detection depends upon the length of irradiation and detection times as well as upon the constituency of the formations. This difficulty is avoided in continuous logging by operating at the optimum logging speed; otherwise, the speed would have to be carefully controlled for continuous logging.

If detection is delayed for a relatively long period of time, the activated nuclei of short half life will have decayed. This permits discrimination against the detection of oxygen and permits the measurement of the presence of other elements, such as silicon. After about one minute substantially all of the $N^{16}$ nuclei will have decayed, whereas the nuclei from activation of silicon have a half life 2.3 minutes and will have decayed but little in the same time. Irradiation for five minutes will be sufficient to activate the silicon appreciably, to 75 percent of equilibrium. The oxygen activation will be completely in equilibrium but at the same time it will decay more rapidly than silicon and will be substantially negligible one minute after the irradiation is ended. At this time measurements of nuclei of longer half lives can be made without interference from the more abundant oxygen which produces such energetic gamma radiation. Pulse height selection may be used at the same time to separate the detection pulses arising from reactions with different nuclei.

An alternative method for performing the stepwise measurement follows. The point of interest is irradiated to saturation as before. A surface recorder chart drive is arranged to drive the chart at a rate uniform with respect to time and is actuated at the instant the neutron source is turned off. Then the logging instrument is drawn upwards at a constant rate of speed past the point which was irradiated. The recorder will indicate a sharp peak as the detector passes this point, the amplitude of which is a measure of the oxygen activation. The distance travelled by the recorder chart indicates the length of the interval between irradiation and detection, and a simple correction curve may be employed to calculate the saturation activity or otherwise to normalize each measurement to allow correlation with the log. This method is not as good statistically as the previous one, but it has the advantage of not requiring additional apparatus or precise positioning of the detector. It may be seen that both stepwise methods tend to eliminate error due to activation of the borehole fluid, since the fluid moves away from the irradiated formation when the instrument is moved.

Other methods may be employed, if a cyclically pulsed neutron source is available. With such a source the detector may be placed as close as physically possible to the source. Then the detector may be synchronided with the source in such a way that it is actuated only during the intervals when the source is not emitting neutrons. If the detector is placed near enough to the source, it will be able to measure oxygen activation while the instrument is stationary in the borehole. In any case, by reducing the distance between source and detector the interval elapsing between irradiation and detection will be reduced, thereby increasing the observed radioactivity and improving the statistical accuracy of the measurement. Moreover, additional information can be obtained from the same detector, for during the portion of the cycle when the source is turned on, it may be employed to make a conventional neutron log.

The oxygen activation log is unique on account of the high energy of the gamma rays produced by this reaction. However, the same detector which is employed to measure the oxygen activation may be used simultaneously to detect the lower energy gamma rays from the products of fast and slow neutron reactions with silicon, aluminum and other elements.

Silicon, in particular, is of interest since it is readily activated and occurs in abundance. Especially in sands the concentration of silicon will indicate the density and porosity of the rock, Accordingly, a well logging instrument may comprise a system for four or more channels to record simultaneously the natural gamma ray and neutron logs (where both these detectors precede the neutron source through the well) and activation logs of oxygen and of lower energy gamma ray emiters, both being, if desired, made with a single detector following the neutron source.

In the case of silicon and other elements which do not emit such high energy gamma rays as oxygen, it is not possible by pulse height selection to isolate completely the detection signals occasioned by the gamma rays from these elements. However, this may be done with some degree of accuracy. Further it is possible to diminish the relative influence of natural gamma rays by using a neutron source of such strength as to overshadow the natural gamma radiation. Alternatively, one may separately measure the natural gamma ray background as above and perform a subtraction operation electronically in order to eliminate this interference from the activation log. A measurement of gamma rays of lesser energy than those produced by oxygen activation will also be influenced by the oxygen activation, since degraded high energy gamma rays will be detected as gamma rays of this lesser energy. The oxygen activation log may be used to compensate for this error.

In continuous activation logging for oxygen, the log will be affected by the fluid in the borehole and its rate of flow past the logging instrument. In one form of this invention, it is proposed to eliminate this effect by moving the equipment stepwise through the well. In this case the neutron source irradiates a stratum and borehole fluid adjacent thereto for a certain period of time. Then the instrument is moved quickly through the hole until the detector is opposite this particular stratum. Where the instrument displaces a relatively large volume of the borehole fluid, this movement through the hole causes the borehole fluid to move relative to the formations so that the fluid opposite the formation at the time of the detection is substantially unirradiated.

Therefore the primary object of this invention is to obtain a log of earth formations which indicates lithology, detects porosity, quantitatively measures oil saturation, and operates without the need for rigorous regulation of logging speed. It is a further object of this invention to measure oxygen selectively by an activation process and to relate oxygen concentration to lithology and oil saturation. Still another object of this invention is to provide for radioactivity well logging at an optimum logging speed at which relatively large variations in logging speed produce relatively negligible changes in the detection signals. It is still another object of the invention to avoid the effect of borehole fluid upon an activation log. Other objects and advantages of the present invention will become apparent from the following detailed description when considered with the accompanying drawings in which:

FIGURE 1 is a diagrammatic illustration of a radioactivity logging operation for activation well logging: and FIGURE 2 is a diagrammatic illustration of apparatus to be used with the apparatus shown in FIGURE 1 to correct for interfering signals.

Referring to the drawings, particularly FIGURE 1, there is illustrated schematically a radioactivity well surveying operation in which a portion of the earth's crust 10 is shown in vertical section. The well 11 may or may not be lined with a casing. Disposed in the well is subsurface instrument 12 of the well logging system. Instrument 12 houses the neutron source and radiation detector and has a housing 13 which is sufficiently strong to withstand pressures and mechanical abuses encountered in a well logging operation. Cable 14 supports the instrument in the well and contains the required conductors for electrically connecting the instrument with the surface apparatus. The cable is wound on or unwound from drum 15 in raising and lowering instrument 12 to traverse the well. Cable 14 is electrically connected to the surface apparatus through slip rings 16 and brushes 17. Enclosed within housing 13 are detectors 18, 19, and 20 and neutron source 21. The neutron source may take the form disclosed in United States Patent No. 2,689,918 of Arthur H. Youmans for "Static Atmosphere Ion Accelerator for Well Logging." Detectors 18, 19, and 20 may be of any of a number of types. Detector 20 is preferably of a type in which electric pulses are derived having energies corresponding to the energies of the gamma rays causing such pulses so as to permit discrimination in favor of high energy pulses and hence to permit selective measurement of high energy gamma rays. These detectors may all be of the scintillation counter type and are to be understood to include any necessary power supplies and amplifiers and discriminators not otherwise shown. It is to be further understood that the instrument may be battery powered or may be supplied with power from the surface of the earth using suitable rectifiers and filters. To perform activation well logging for oxygen, the instrument 12 is raised in the well at a constant speed. The exact speed is not important where the speed is relatively close to the optimum logging speed. As the instrument 12 is raised in the hole, high energy neutrons are emitted from source 21 to irradiate the formations. As above mentioned, for the activation of oxygen it is necessary that the energy of these neutrons be greater than 10.6 Mev. Such neutrons may be obtained by the reaction between deuterium and tritium. Following the source up the well is the activation logging detector 20. Detector 20 is spaced from source 21 so as to be out of range of gamma radiation produced instantaneously upon the bombardment of the formations by the neutrons from source 21. Material intervening between the effective part of the source and the sensitive part of the detector stops these gamma rays. Hereafter, when source to detector spacing is mentioned, it means this distance between the effective part of the source and the gamma ray sensitive part of the detector. If the associated apparatus between these two is not dense enough a separate shield 22 of dense material, such as lead, may be interposed. Detector 20 will therefore detect gamma rays emitted from the formations by nuclei left in excited states due to bombardment from neutron source 21 which passed by a fixed time previously. It will also detect the gamma radiation naturally emitted by the formations. If the neutron source is strong enough the effect of the natural gamma rays will be overshadowed. However, in most cases it will be necessary to eliminate the effect of the natural gamma rays by a pulse height discriminator. A pulse height discriminator comprises conventional circuitry which by biasing or other means has an established threshold voltage such that it is insensitive to electric pulses of a voltage less than this threshold but which permits pulses of higher voltage to pass on to succeeding apparatus. By combining such circuits it is possible to provide a pulse selector which will select electric pulses of voltages lying within a certain range or ranges. For some purposes, it may be useful to provide such a discriminator in the subsurface part of the output circuit of the activation logging detector 20 and then to apply the output of the discriminator to a scaling circuit to reduce the number of pulses applied to the cable 14. This may be necessary when the cable characteristics are such that higher rates of pulses may not be placed upon the cable without mutual interference. As shown the output of the activation logging detector is applied directly to a conductor of cable 14 and transmitted to the surface to a surface discriminator 23. For oxygen activation logging, discriminator 23 is biased so that only pulses representative of gamma rays having energies greater than 1.5 mev, are passed to shaper 24, which acts to make all pulses of the same size and shape in order that they all have the same effect upon pulse rate conversion circuit 25. Pulse rate conversion circuit 25 operates in a conventional manner to produce a direct current output of magnitude related to the number of pulses applied thereto from shaper 24. This output is applied to recorder 26. Recorder 26 is driven through a transmission 27 by a measuring reel 28 over which the cable 14 is drawn so that the chart of recorder 26 moves in correlation with depth as instrument 12 traverses the well. A well log is thereby made in which the degree of oxygen activation is recorded as a function of depth. Thus the log is indicative of the relative presence of oxygen and hence is indicative of lithology and oil saturation.

In order to obtain maximum response, the space between source 21 and detector 20 is from four to ten feet, preferably about six feet. The logging speed for optimum operation is determined by the above equation. For oxygen logging this optimum logging speed is from 20 to 60 feet per minute depending upon the spacing. It is of the order of 34 feet per minute for a spacing of six feet.

Although source 21 is shown to be self-contained it may be powered from the surface of the earth through cable 14. This source may be used simultaneously for conventional neutron logging wherein the formations are irradiated with neutrons and gamma rays or neutrons or both thereupon reaching the borehole from the formations are simultaneously measured in a nearby detector. In this case neutron logging detector 19 is used to make this so-called neutron log. Shield 29 is interposed between source 21 and detector 19 in order to prevent the direct transmission of any radiations or particles which might be detected by the detector 19. The output of detector 19 is transmitted through cable 14 to the surface shaper 30 and then to pulse rate conversion circuit 31 which function in the manner of shaper 24 and pulse rate conversion circuit 25, respectively, to derive a neutron logging signal for simultaneous recording by recorder 26. Detector 19 precedes the source through the hole and therefore is not affected by activation phenomena. At the same time a natural gamma ray log may be made by use of detector 18 which precedes the source 21 by such distance as to detect neither the instantaneous nor the delayed phenomena produced by source 21. Similar to the conventional neutron channel, the output of detector 18 is sent through cable 14 to shaper 32 and pulse rate conversion circuit 33 for simultaneous recording by recorder 26.

In order to make a multiplicity of activation logs simultaneously, the output of activation logging detector 20 may be applied to one or more other channels such as to pulse height selector 34 which functions in a conventional manner to pass only pulses of a selected range which are therefore indicative of gamma rays of a particular range of energies and hence of gamma rays coming from a reaction producing gamma rays of such characteristic energies. Pulse height selector 34 may be adjusted to pass pulses indicative of gamma rays characteristic of a particular element, such as silicon. These pulses are then applied as for the other channels to shaper 35 and pulse rate conversion circuit 36 for recording by recorder 26.

The output of pulse rate conversion circuit 25 is not influenced by natural gamma rays or other activation gamma rays because discriminator 23 selects only the gamma rays of highest energy and gamma rays from oxygen activation are higher than any other such gamma rays. However, the output of pulse rate conversion circuit 36 is not so free from interference. It may include the results of the detection of both natural gamma rays and degraded oxygen activation gamma rays. In FIGURE 2 is disclosed means for removing these interfering signals. The output of natural gamma ray detector 18, which for this purpose must be of the type that produces electric pulses of energies corresponding to the energies of detected gamma rays, is applied to a delay unit 37. This delay unit may be of the sort disclosed in United States Patent No. 2,436,503 to James Y. Cleveland and is for the same purpose, to delay the use of the detection signals from detector 18 until detector 20 comes opposite the formation giving rise to such signals. It is necessary in any system requiring the combination of signals from detectors which instantaneously are detecting phenomena from different horizons. The delayed pulses are applied to pulse height selector 38 which selects pulses corresponding to gamma rays of the same energy as those passed by pulse height selector 34. The selected pulses are shaped by shaper 39 and converted to a direct current by a pulse rate conversion circuit 40. This direct current is passed through resistor 41. The output of pulse rate conversion circuit 25 is passed through resistor 42, and the output of pulse rate conversion circuit 36 is passed through resistor 43. The resistors 41, 42, and 43 are of such magnitude as to adjust empirically for differences in detector sensitivity and to account for the proper percentage of the oxygen activation gamma rays, as measured in the output of pulse rate conversion circuit 25, which appear degraded as part of the output of pulse rate conversion circuit 36. The resistors 41, 42, and 43 may then be connected to permit subtraction of the effect of degraded oxygen activation gamma rays and of natural gamma rays from the output of pulse rate conversion circuit 36. This combined output may then be recorded by recorder 26 as indicative of activation gamma rays of a particular energy which may be indicative of the presence of a particular element.

The apparatus of this invention may then be used to make simultaneous logs including logs of natural gamma radiation, neutron logs, and any number of activation logs.

The apparatus as described may be equally well used for stepwise logging in which the neutron source 21 irradiates a particular formation for a fixed length of time and then the instrument 12 is moved up the hole to permit the activation logging detector 20 to measure the degree of activation. Where timing of various steps is important, it is understood that conventional timing devices may be used. These may be automatic, but also contemplated is manual operation wherein the operator controls operation in accordance with a clock.

It is to be understood that this invention is not to be limited to these specific modifications described, but it is to include all methods and apparatus for activation well logging as limited only by the following claims.

I claim:

1. A method of logging a borehole comprising the steps of bombarding with neutrons the earth formations and fluids contained therein surrounding the borehole, producing by said neutron bombardment new isotopes of the chemical elements of which the formations and contained fluids are composed and producing simutlaneously incidental gamma rays which are unwanted and uncounted, said new isotopes being radioactive and decaying after bombardment with characteristic half-lives, one of which is the half-life of the isotope it is desired to detect, the half-lives of the other isotopes present being either too long or too short to interfere in detection of said desired isotope and emitting gamma rays of energies characteritsic of said new isotopes, detecting at a single selected time interval after termination of said neutron bombardment intensities of gamma radiation which accompany said decay and which have an energy lying within a preselected energy range, the time interval and energy range selected being dependent upon the know half-life of the radiation characteristic of the decay of the isotope desired to be detected, and recording the intensity of the gamma rays to indicate amounts of the isotope desired to be detected.

2. A method of logging a borehole as recited in claim 1 including detecting at said single selected time interval after said neutron bombardment intensities of gamma radiation which accompany beta decay and which have an energy lying within a preselected energy range.

3. A method of measuring the relative oxygen content of earth formations that comprises the steps of irradiating particular formations with neutrons having energies greater than 10.6 mev., ceasing said irradiating of said particular formations, and thereafter selectively measuring gamma rays emitted by said particular formations having energies between 1.5 mev. and 3 mev. at the point of measurement.

4. A radioactivity well logging method for measuring the relative number of nuclei of a particular element present in earth formations surrounding a well that comprises the steps of traversing said well with a source of neutrons having sufficient energy to activate said nuclei, and measuring gamma rays with a detector following a fixed effective distance L behind said source, the rate of traverse $V_0$ being substantially in the relatonship $$V_0 = \lambda L$$

where $\lambda$ is the decay constant for said activated nuclei.

5. A radioactivity well logging method for measuring the relative number of nuclei of a particular element present in earth formations surrounding a well that comprises the steps of traversing said well with a source of neutrons having sufficient energy to activate said nuclei, and measuring gamma rays with a detector following a fixed effective distance L behind said source, the rate of traverse $V_0$ being substantially in the relationship $$V_0 = \lambda L$$

where $\lambda$ is the decay constant for said activated nuclei and L is so large that said detector is substantially out of range of gamma rays produced instantaneously by neutron reaction.

6. A radioactivity well logging method for measuring the relative number of nuclei of a particular element present in earth formations surrounding a well that comprises the steps of traversing said well with a source of neutrons having sufficient energy to activate said nuclei, and measuring gamma rays with a detector following a fixed effective distance L behind said source, the rate of traverse $V_0$ being substantially in the relationship $$V_0 = \lambda L$$

where $\lambda$ is the decay constant for said activated nuclei and L is from 4 to 10 feet.

7. A radioactivity well logging method for measuring the relative oxygen content of earth formations surrounding a well that comprises the steps of traversing said well with a source of neutrons having energies greater than 10.6 mev., and measuring gamma rays having energies between 1.5 mev. and 3 mev. with a detector following a fixed effective distance L behind said source, the rate of traverse $V_0$ being substantially in the relationship $$V_0 = \lambda L$$

where $\lambda$ is the decay constant for nitrogen-16.

8. A radioactivity well logging method for measuring the relative oxygen content of earth formations surrounding a well that comprise the steps of traversing said well with a source of neutrons having energies greater than 10.6 mev., and measuring gamma rays with a detector following a fixed effective distance L behind said source, the rate of traverse $V_0$ being substantially in the relationship $$V_0 = \lambda L$$

where $\lambda$ is 0.094 per second and L is more than 4 feet.

9. A method of measuring the relative number of nuclei of a particular element in earth formations that comprises the steps of irradiating particular formations with neutrons having energies greater than 10.6 mev., ceasing said irradiating of said particular formations, thereafter detecting gamma rays emitted by said particular formations by producing systematically related electrical pulses, separating said pulses into groups according to pulse height, a first group consisting of pulses in a fixed range of pulse heights and a second group consisting of pulses of height above said range, deriving two separate signals indicative of the rate of occurrence of pulses in each group, and differentially combining said derived signals to eliminate from the signal indicative of gamma rays of particular energies that component occasioned by the degradation of more energetic gamma rays.

10. A method of measuring the relative oxygen content of earth formations that comprises the steps of irradiating a particular formation with a stationary source of neutrons having energies greater than 10.6 mev. for a predetermined interval of time, thereupon simultaneously removing said source and placing a gamma ray detector opposite said formation, and thereafter measuring gamma rays emitted by said particular formations having energies greater than 1.5 mev. and less than 3 mev.

11. A method of measuring the relative oxygen content of earth formations that comprises repeating the steps of irradiating a first formation with a stationary source of neutrons having energies greater than 10.6 mev. for a predetermined interval of time, thereupon simultaneously removing said source to a second formation and placing a gamma ray detector opposite said first formation, and thereafter simultaneously measuring gamma rays emitted by said first formations having energies greater than 1.5 mev. and less than 3 mev. and irradiating said second formation and said predetermined interval.

12. A method of measuring the relative oxygen content of earth formations that comprises the steps of irradiating a particular formation with a stationary source of neutrons having energies greater than 10.6 mev. for a predetermined interval of time of at least one minute, thereupon passing a gamma ray detector at a uniform rate by said formation, and measuring gamma rays having energies greater than 1.5 mev. and less than 3 mev.

13. Apparatus for measuring the relative number of nuclei of a particular element present in earth formations surrounding a well that comprises a source of neutrons having sufficient energy to activate said nuclei, means for traversing the well with said source at a rate $V_0$, a gamma ray detector fixed an effective distance L behind said source, the distance L being substantially in the relationship $$L = V_0/\lambda$$

where $\lambda$ is the decay constant for said activated nuclei.

References Cited

UNITED STATES PATENTS 2,948,810  8/1960  Caldwell et al. _____ 250—83.3

ARCHIE R. BORCHELT, Primary Examiner

U.S. Cl. X.R.

250—71.5